United States Patent
Udo Velten et al.

(10) Patent No.: US 11,500,091 B2
(45) Date of Patent: Nov. 15, 2022

(54) NON-LINE-OF-SIGHT IMAGING SYSTEM FOR DISTANT MEASUREMENT

(71) Applicant: Wisconsin Alumni Research Foundation, Madison, WI (US)

(72) Inventors: Andreas Udo Velten, Madison, WI (US); Marco La Manna, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 846 days.

(21) Appl. No.: 16/352,481

(22) Filed: Mar. 13, 2019

(65) Prior Publication Data

US 2020/0292702 A1 Sep. 17, 2020

(51) Int. Cl.
| | | |
|---|---|---|
| *G01S 17/08* | (2006.01) | |
| *G01S 7/486* | (2020.01) | |
| *G01S 7/4865* | (2020.01) | |
| *G01S 7/4861* | (2020.01) | |

(52) U.S. Cl.
CPC ............ *G01S 17/08* (2013.01); *G01S 7/4861* (2013.01); *G01S 7/4865* (2013.01)

(58) Field of Classification Search
CPC .......... G01S 17/08; G01S 17/86; G01S 17/89; G01S 17/10; G01S 7/4861; G01S 7/4865
See application file for complete search history.

(56) References Cited

U.S. PATENT DOCUMENTS

| | | | | |
|---|---|---|---|---|
| 7,738,083 | B2* | 6/2010 | Luo | G01S 17/34 |
| | | | | 356/5.15 |
| 9,829,564 | B2* | 11/2017 | Bruder | G01S 11/12 |
| 2009/0147239 | A1* | 6/2009 | Zhu | G01S 7/4812 |
| | | | | 356/3.12 |
| 2011/0188028 | A1* | 8/2011 | Hui | G01S 17/36 |
| | | | | 356/5.01 |
| 2011/0242286 | A1* | 10/2011 | Pace | H04N 13/133 |
| | | | | 348/47 |
| 2012/0075423 | A1* | 3/2012 | Kirmani | G01S 7/481 |
| | | | | 348/46 |
| 2012/0300062 | A1 | 11/2012 | Pardharkar et al. | |
| 2013/0100250 | A1 | 4/2013 | Raskar et al. | |
| 2014/0347676 | A1 | 11/2014 | Velten et al. | |
| 2016/0014393 | A1* | 1/2016 | Kadambi | G01S 17/003 |
| | | | | 348/50 |
| 2016/0124089 | A1* | 5/2016 | Meinherz | G01S 17/86 |
| | | | | 356/5.01 |
| 2016/0138904 | A1 | 5/2016 | Velten et al. | |
| 2017/0176575 | A1* | 6/2017 | Smits | G01S 7/484 |
| 2018/0007507 | A1* | 1/2018 | Ghabra | H04B 1/3822 |
| 2018/0063681 | A1* | 3/2018 | Mankovskii | H04L 63/107 |
| 2018/0136129 | A1* | 5/2018 | Rizo | A61B 5/6886 |
| 2018/0211373 | A1* | 7/2018 | Stoppa | G06K 9/4628 |
| 2018/0309970 | A1 | 10/2018 | Gupta et al. | |
| 2019/0146073 | A1 | 5/2019 | Gutierrez et al. | |

* cited by examiner

*Primary Examiner* — Sang H Nguyen
(74) *Attorney, Agent, or Firm* — Boyle Fredrickson, S.C.

(57) ABSTRACT

An improved non-line-of-sight camera provides for real-time evaluation of a relay wall with respect to illuminated points and sensing areas for higher accuracy and practical field use. Gated sensing allows improved recovery of faint photon signals and higher resolution. The system allows an operator to a find virtual camera from looking around multiple corners.

21 Claims, 6 Drawing Sheets

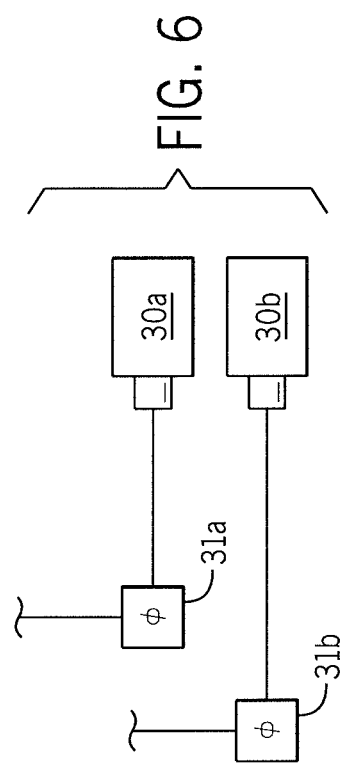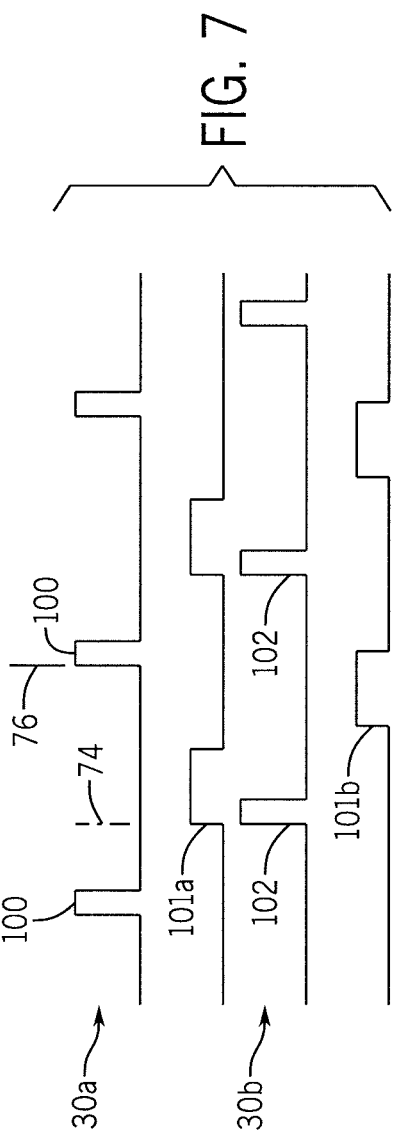

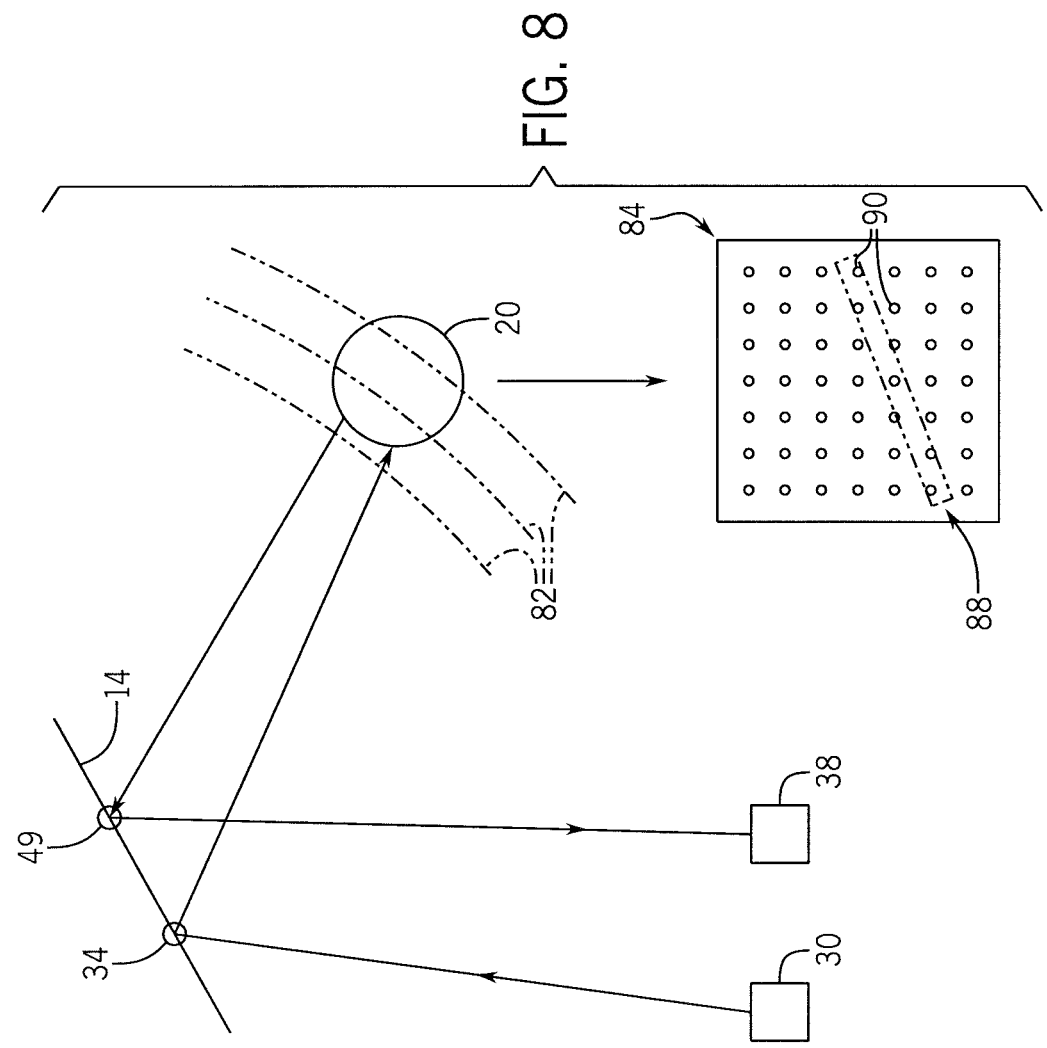
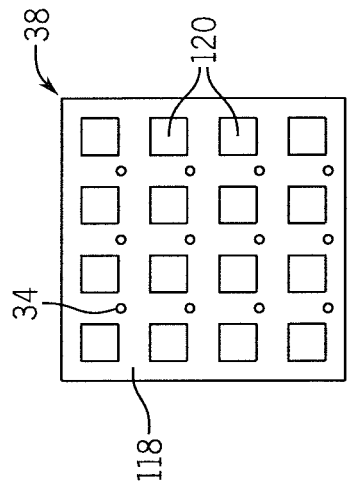
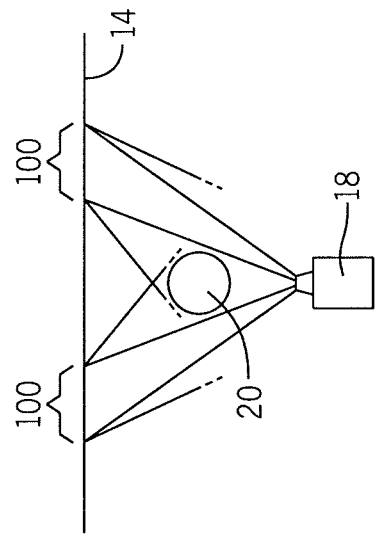

NON-LINE-OF-SIGHT IMAGING SYSTEM FOR DISTANT MEASUREMENT

STATEMENT REGARDING FEDERALLY SPONSORED RESEARCH OR DEVELOPMENT

This invention was made with government support under HR0011-16-C-0025 awarded by the DOD/DARPA. The government has certain rights in the invention.

CROSS REFERENCE TO RELATED APPLICATION

BACKGROUND OF THE INVENTION

The present invention relates to active imaging systems for non-line-of-sight scenarios and in particular to a non-line-of-sight system that can perform such imaging at a long-range and/or after reflections off of multiple intervening surfaces.

Non-line-of-sight imaging systems are intended to capture images of objects that are "around a corner," that is, where there is no unbroken "line-of-sight" extending between the image object and the imaging system. Current non-line-of-sight systems employ light detectors with extremely high time accuracy to measure the time-of-flight of individual photons as they arrive from the image surface. The photons are originally emitted from a laser near the light detector and bounce off of a "relay" wall in a non-specular reflection to then illuminate the object to be imaged. Light reflected from the object to be imaged returns to the light detector after again reflecting off of the relay wall.

A computer implemented reconstruction of the time-of-flight measurements, such as back projection, produces an image. This reconstruction process uses precise characterization of the optical path between the imaging system and the relay wall normally obtained by physical measurements of the relay wall or setting of the relay wall at a predetermined location and orientation. An example a prior art non-line-of-sight camera is the MIT "CORNAR" camera described in U.S. Pat. No. 9,148,649, sharing a coinventor of the present invention, and hereby incorporated by reference.

Current non-line-of-sight systems are currently limited to relatively small "desktop" set ups in a laboratory where the total optical path is relatively short and each of the components may be precisely positioned, for example, on an optical bench. The difficulty in detecting the faint optical signals (single photons) returning from a distant imaged object limit the range of such systems.

SUMMARY OF THE INVENTION

The present invention provides a non-line-of-imaging system that can be used in uncontrolled environments where the system may confront a distant relay wall of unknown position and orientation. In this regard, the invention provides an optical position finder, for example, using light returning from the illuminating laser both for imaging and for characterizing the relay wall and optionally secondary relay walls for viewing around multiple corners. Dynamic adjustment of the pulse repetition rate of the laser and gating of the detector greatly increases the range of detection from less than a meter to many meters required for meaningful use of such systems in the field.

Specifically then, in one embodiment, the invention provides a non-line-of-sight imaging system having a light source emitting light pulses along a propagation direction receivable by a relay wall at a variety of illumination points. A time-of-flight detector, synchronized with the light source, receives light back against the propagation direction to produce time-of-flight measurements of photons returning from the relay wall after reflection off of an object not within a line-of-sight of the time-of-flight detector. An optical position finder provides a position measurement of the illumination points on the relay and an electronic computer receives the time-of-flight measurements from the time-of-flight detector for each of the illumination points and measurement positions of each of the illumination points to produce an image of an object receiving light from the relay wall.

It is thus a feature of at least one embodiment of the invention to provide a non-line-of-sight system that can practically be used in the field when the relay wall is remote and of arbitrary size and orientation and with curvature or other irregularity. It is another feature of at least one embodiment of the invention to provide dynamic characterization of the relay wall and its orientation with respect to the imaging system allowing the camera to operate when the imaging system and relay wall are in relative motion.

The optical position finder may employ reflected light from the light source.

It is thus a feature of at least one embodiment of the invention to use the same light source used for imaging to characterize the relay wall, reducing unnecessary components and/or allowing repeated characterization of later relay walls in the imaging chain using the same sensitive detector system.

The optical position finder may measure a location of the illumination points concurrent with their illumination.

It is thus a feature of at least one embodiment of the invention to provide precise characterization of the illumination points without need to fully characterize the wall itself. By measuring the actual illumination points, the invention not only accommodates wall irregularities but compensates for variations in the steering of the laser beam producing the illumination points.

The non-line-of-sight imaging system may further measure a focal center of the time-of-flight camera on the relay wall.

It is thus a feature of at least one embodiment of the invention to facilitate a non-confocal optical system by characterizing not only the outgoing optical path but the offset incoming optical path to the detector.

The non-line-of-sight imaging system may include a targeting laser transmitting a beam to strike the relay wall at the focal center of the time-of-flight detector visible by the optical position finder.

It is thus a feature of at least one embodiment of the invention to permit the same optical position finder used to identify the location of the illumination points to be used to characterize the focal center of the time-of-flight detector.

The optical rangefinder may provide a first and second camera displaced from each other and each providing angular measurements of each illumination point to provide for triangulation of the illumination point.

It is thus a feature of at least one embodiment of the invention to provide extremely precise characterization of the illumination points and/or focal center of the detector at mid-ranges using triangulation of point illumination at the first relay wall.

The time-of-flight detector may use a gating signal from the electronic computer controlling time-of-flight measurements by the time-of-flight detector to occur exclusively after a gating time, and the electronic computer may adjust the gating time to occur after receipt of light from the light source after initial reflection from the relay wall from each given illumination point.

It is thus a feature of at least one embodiment of the invention to block saturation of the sensitive light detector by an initial reflection from the relay wall.

The electronic computer may monitor the time-of-flight detector to detect receipt of light from the light source after initial reflection from the relay wall to adjust the gate interval to occur after receipt of light from the light source after the initial reflection from the relay wall from each given illumination point.

It is thus a feature of at least one embodiment of the invention to permit dynamic gating of the detector to accommodate variations in the location of the relay wall, for example, with relative motion of the camera and relay wall, or from extremely oblique relay wall orientations that can occur among a variety of static environments.

The gate interval is adjusted by the electronic computer according to stored different values for different illumination points. The stored values may be dynamically updated.

It is thus a feature of at least one embodiment of the invention to anticipate different gating intervals as one moves through the illumination points.

The gating time may be adjustably delayed after the receipt of light from the light source after the initial reflection from the relay wall from each given illumination point to resolve photon time-of-flight within a hold-off time of the sensor.

It is thus a feature of at least one embodiment of the invention to increase the signal to noise ratio of the data through staggered gating that subdivides the acquisition interval of the imaging system.

The light source may have a pulse control input controlling the pulse repetition rate of the light source, and the electronic computer may monitor the time-of-flight detector to detect a decay of light received by the time-of-flight detector after illumination of each illumination point on the relay wall to determine a quiet time after which no further measurable light is received. The electronic computer may use this information to adjust the pulse repetition rate to cover the entire hidden scene, but be no less than the quiet time.

It is thus a feature of at least one embodiment of the invention to maximize data acquisition speed up to the limits of receiving interfering measurements of received light from previous measurement intervals.

The electronic computer may receive inputs identifying a region of a second relay wall after the first relay wall may reconstruct an image from a point of view of a second relay wall receiving light from the first relay wall.

It is thus a feature of at least one embodiment of the invention to permit "looking around two corners" by designating reflective surfaces after the first relay wall as secondary relay walls.

The non-line-of-sight imaging system may include a display communicating with the electronic computer to display a reconstructed image from a point of view of the relay wall and identifying in the reconstructed image a second relay wall receiving light from the first relay wall to reconstruct an image from a point of view of the second relay wall.

It is thus a feature of at least one embodiment of the invention to allow the user to select reflective surfaces imaged by the non-line-of-sight imaging system as secondary illumination points in turn used for imaging.

In one example, the electronic computer may determine a region of the second relay wall free from occlusion by the object between the first relay wall and second relay wall and reconstructs an image from a point of view of the relay wall to produce an image of a rear side of the object.

It is thus a feature of at least one embodiment of the invention to provide an imaging system that can image the rear side of objects without movement of the imaging system or object.

The time-of-flight detector may provide multiple independent detectors each having different focal axes displaced from an axis of propagation of the light source.

It is thus a feature of at least one embodiment of the invention to provide a non-confocal construction realizing two benefits. First, the non-confocal construction permits parallel data acquisition for improved acquisition speeds. Second, the non-confocal construction reduces the noise caused by an effect known as "pile-up", and by after-pulsing which can be encountered by a confocal system, even in the presence of a gated detector.

The light source may produce two distinguishable frequencies of light, and imaging system may be equipped with two time-of-flight detector that provide separate measurements for each frequency of light.

It is thus a feature of at least one embodiment of the invention to provide an additional data acquisition dimension that can be used, for example, to produce "color images" having additional frequency content or which may be used to accelerate the acquisition process by parallel data acquisition at the two different frequencies.

The time-of-flight detector may provide simultaneous independent measurements of different illumination points to provide increased scanning speed through the illumination points.

It is thus a feature of at least one embodiment of the invention to greatly increase the acquisition speed of the images to permit video or near-video recording speeds.

These particular objects and advantages may apply to only some embodiments falling within the claims and thus do not define the scope of the invention.

BRIEF DESCRIPTION OF THE DRAWINGS

FIG. 6 is a fragmentary block diagram similar to FIG. 2 showing the use of two lasers having different operating frequencies for faster acquisition;

FIG. 7 is a timing diagram showing a pulse repetition rate of the lasers of FIG. 6 showing interleaved acquisition;

FIG. 8 is a geometric representation of the light path with respect to a first relay wall showing projection surfaces and the identification of a second virtual camera on a secondary relay wall;

FIG. 9 is a schematic representation of a two-dimensional light detector for providing improved non-confocal data acquisition; and FIG. 10 is a plan view of optical paths that may be used by the present invention to image the back side of an object.

DETAILED DESCRIPTION OF PREFERRED EMBODIMENT

Figure 1:
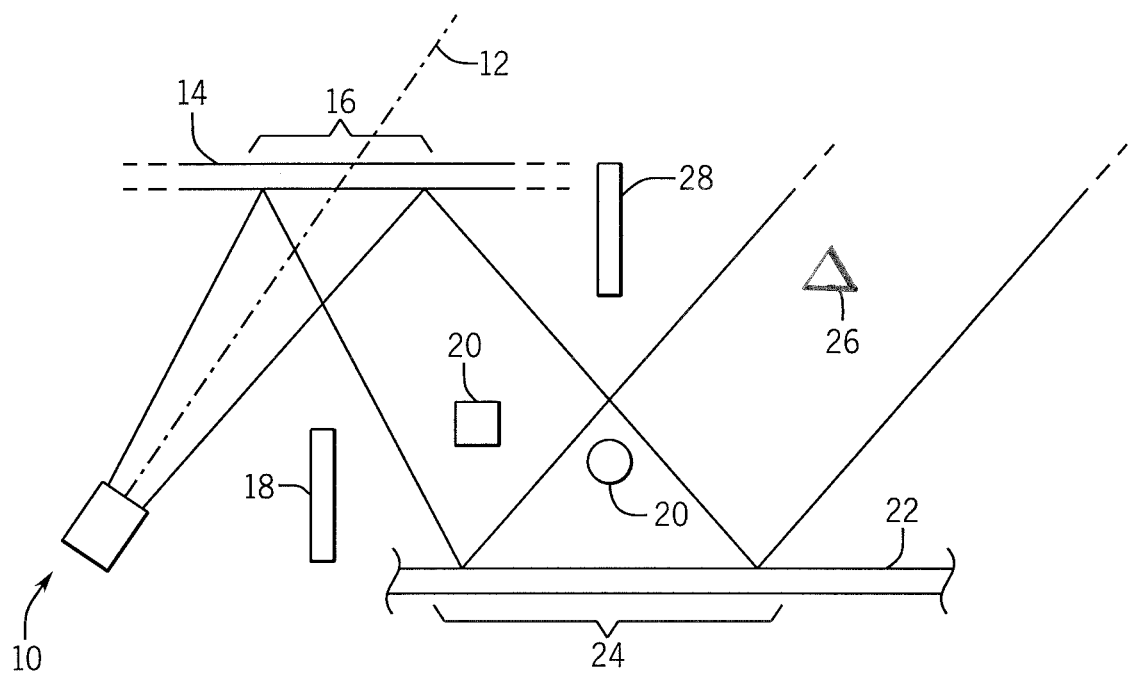
FIG. 1 is a plan view of the optical path geometry of the imaging system of the present invention showing the imaging system and imaged objects with respect to a first and second occluding wall.

Referring now to FIG. 1, a non-line-of-sight (NLOS) system 10 per the present invention may be positioned to direct light along a line-of-sight 12 where it strikes a surface of a relay wall 14 over a first light relay area 16. The surface of the relay wall 14 must be diffuse but is generally non-specular and need not be planar or continuous in the present invention.

Light reflected from the surface of the relay wall 14 may pass around an occluder 18 (first corner) to illuminate objects 20 on the other side of the occluder 18. Significantly, occluder 18 blocks imaging therethrough and is positioned such that a straight line between the objects 20 and the non-line-of-sight camera system 10 passes through the occluder 18 preventing direct imaging of the objects 20.

Light from the surface of the relay wall 14 is reflected off of the objects 20 which are also generally non-specular. This light reflected from the objects 20 passes back to the first light relay area 16 where it measured by the NLOS camera system 10 to provide an image of the imaged objects 20.

Some of the light reflected from the first light relay area 16 toward the objects 20 will pass by the objects 20 and may strike the surface of a secondary relay wall 22 over a second light relay area 24. Light reflected off the second light relay area 24 may illuminate the rear surfaces of objects 20 to be reflected off of these rear surfaces to return to the second light relay area 24. This light reflecting off the second light relay area 24 may be received by the first light relay area 16 again to be captured by the NLOS camera system 10.

In addition, some light received by the second light relay area 24 may reflect from the second light relay area 24 around a second occluder 28 to illuminate object 26 behind second occluder 28. Light reflected off of the object 26 may pass via the second light relay area 24 and first light relay area 16 back to the NLOS camera system 10, a process that is limited only by the ability to detect that received light. As recognized by the inventors, the size of successive light relay areas 16 and 24 may progressively increase to offset some or all of the attenuation of photons with distance under the inverse square law.

Figure 2:
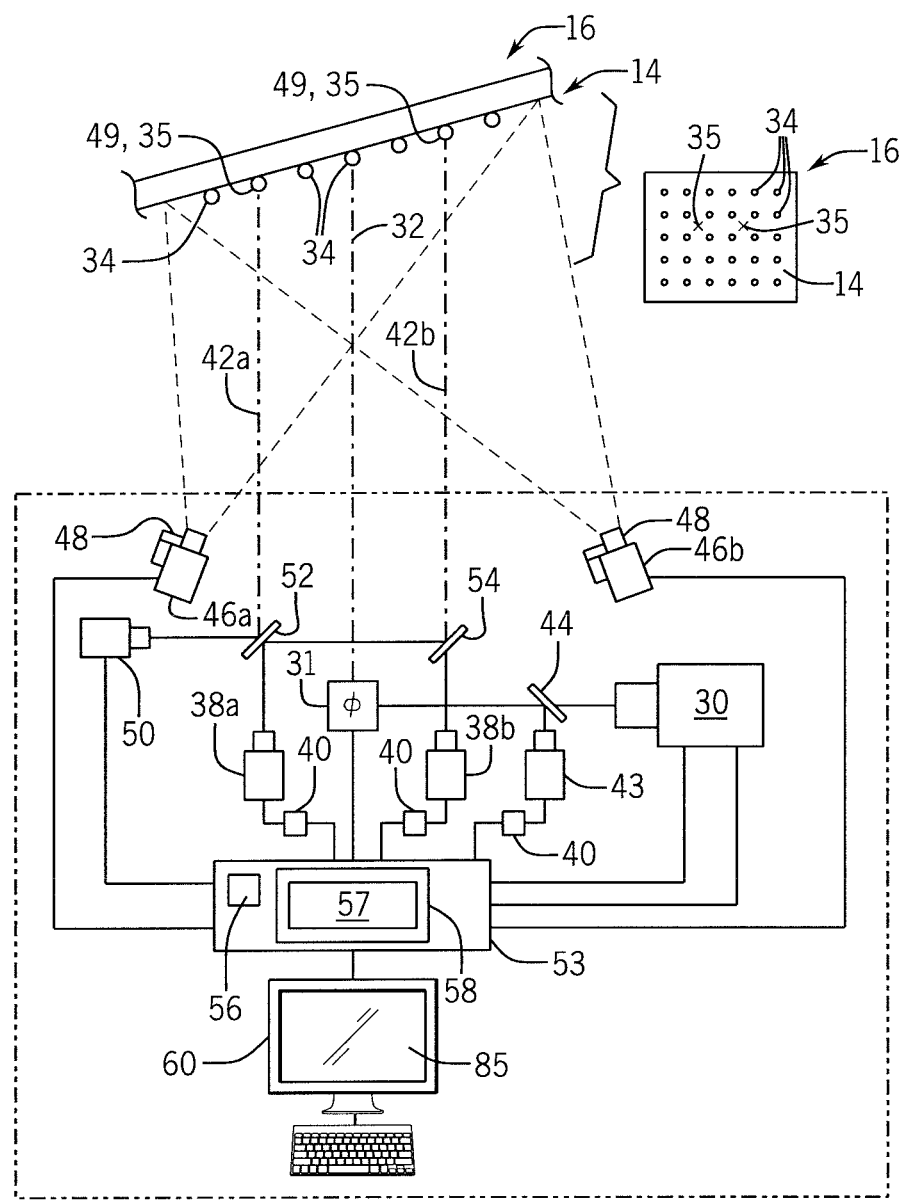
FIG. 2 is a block diagram of the imaging system of the present invention showing a plan view of light trajectories with an elevational view of an illumination point pattern produced thereby.

Referring now to FIG. 2, the NLOS camera system 10 may generally provide a high-speed, pulsed laser 30, for example, a Katana HP fiber laser commercially available from NKT Photonics of Copenhagen Denmark. The laser 30 may operate at two wavelengths of 1064 nm and 532 nm, electrically switchable, and may produce pulses that are 35+or −15 ps long with a pulse repetition frequency tunable from 0.05 to 10 MHz. In addition, the current driving the laser 30 can be adjusted from 0 to 10 A to change the maximum power appropriately.

Light from the laser 30 is received by a mirror of a galvanometer 31 of conventional design that can steer a beam of the laser 30 along a movable beam axis 32 among successive illumination points 34 dispersed in a grid over two dimensions (horizontally and vertically) on the relay wall 14 within the light relay area 16 as shown in the inset of FIG. 2.

Depending on the operating wavelength, the light returned by reflection off of the relay wall 14 may be captured by one of the two different single-photon avalanche diode detectors (SPADs) 38a and 38b each having autofocusing lens 41 for focusing on the front surface of the relay wall 14. Significantly the SPADs 38 are arranged to be non-confocal with the beam axis 32 of the laser 30, by having central focal axes 42a and 42b displaced from axis 32 and thus having focal centers 49 removed from illumination points 34. Each of the SPADs 38 may employ a filter allowing it to decrease the noise produced by wavelengths close to the operating one(s). Ideally the filters are band pass filters centered along the emission peaks of the frequencies of the laser 30 for the reduction of noise. Suitable SPADs 38 are available from Micro Photon Devices of Bolzano, Italy, employing silicon or indium gallium arsenide detectors, respectively, for the different frequency sensitivities.

The electrical signals from the laser 30 and the SPADs 38 are received by a high-accuracy synchronizing unit, for example, the HydraHarp 400 time-correlated single photon counting (TCSPC) unit commercially available from Pico Quant of Berlin Germany. With a user defined resolution, but no less than 1 ps, the HydraHarp 400 calculates the time difference between the laser pulse and the photon time-of-arrival, used to provide a histogram of photon counts as a function of time.

A third SPAD 43 of similar manufacture to SPADs 38 may receive light passing confocally backward along axis 32 of the laser 30, through the galvanometer 31 and separated by beam splitter 44, to provide a supplementary time-of-arrival signal to time-of-arrival clock 40 that may be used to provide time-of-flight ranging information helping to characterize the location of the illumination points 34, although generally higher lateral accuracy and resolution will be obtained using a stereo camera described below. The SPAD 43 can also be used to monitor the received power reflected light from each illumination point 34 to adjust the power of the laser 30 appropriately, for example, to accommodate reflective differences.

A stereo camera sub-system having left and right cameras 46a and 46b, each including autofocusing lenses 48 for focusing on the light relay area 16, are preferentially used over SPAD 43 to accurately locate each illumination point 34. This location is done through conventional geometric triangulation making use of the known field of view of the cameras and a measurement of each illumination point 34 on the two-dimensional camera sensor. The result is a three-dimensional coordinate of each illumination point 34 over the two dimensions of the light relay area 16.

A marker laser 50 may direct a beam through beam splitters 52 and 54 so that the beam is aligned with axes 42a and 42b of the SPADs 38. The marker laser 50 creates marker spots 35 in the light relay area 16 allowing the stereo cameras 46 to also identify the location of the focal point of the SPADs 38 as needed for subsequent calculations. Marker spots 35 can be distinguished from illumination points 34, for example, according to their timing.

Control signals from the above described components may be received by an interface circuitry on a computer 53. These controllers may include signals passing to the laser 30 necessary for frequency control, power control, repetition rate control for the laser 30, and pulse timing signal data from the laser 30 to the computer 53. The synchronizing unit 40 may also provide histogram data to the computer 53 for each of the SPADs 38a, 38b and 43. The computer 53 may provide control signals to the galvanometer 31 to generate, in conjunction with timing of the laser 30, the steering of the beam of the laser 30 required to produce the grid of illumination points 34. The computer 53 may control the marker laser 50 and may receive position information from the cameras 46 allowing identification of the three-dimensional coordinates of the illumination points 34.

Generally, the computer 53 will include one or more processors 56 executing stored programs 57 held in standard computer memory 58. The computer 53 may communicate with a display terminal 60 of well-known type providing for graphic output to a user and accepting input from user through a keyboard, mouse, or the like.

Figure 3:
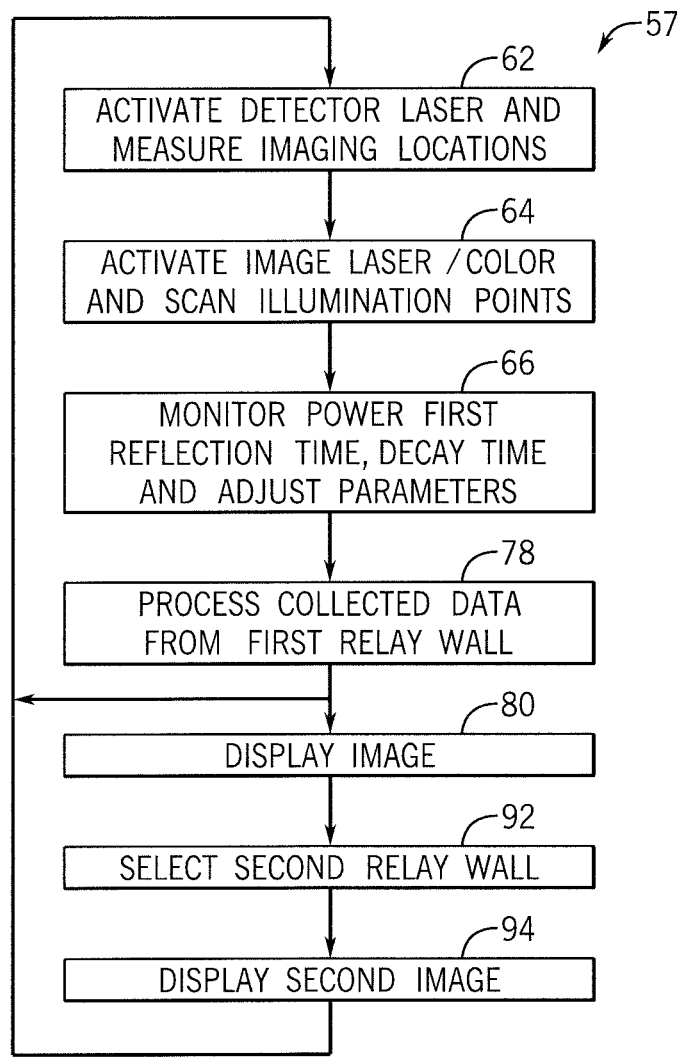
FIG. 3 is a flowchart of the operation of the imaging system of FIG. 2 producing a non-line-of-sight image.

Referring now to FIG. 3, the program 57 executed by the computer 53 may first operate to activate the detector marker laser 50 and the stereo cameras 46 to measure the focal centers 49 of the SPADs 38 as indicated by process block 62.

At process block 64, laser 30 is activated and galvanometer 31 controlled to scan through the illumination points 34 producing the indicated grid. Per process block 66 during that scanning process, the reflected power may be monitored to adjust the control current of the laser 30. Also during the scanning process, the SPADs 38 will be gated according to reflection time and decay time to be described below.

Figure 5:
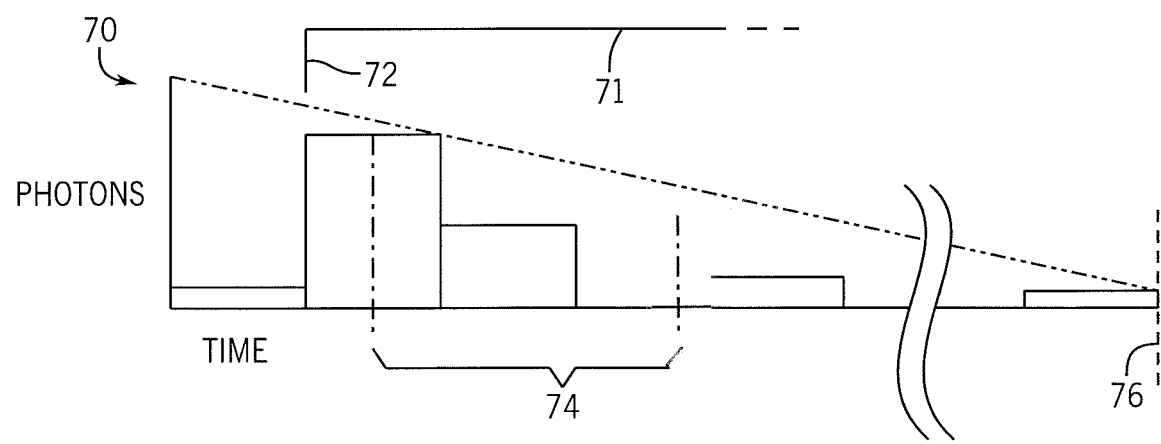
FIG. 5 is a histogram of time-of-flight information collected by the present invention showing different gating intervals and determination of a pulse repetition time.

Referring momentarily also to FIG. 5, between illumination of each illumination point 34, the synchronizing unit receiving the signals from the laser 30 and a SPAD (38a, 38b or 40) provides histogram data 70 represented as a histogram having a horizontal time axis having discrete time bins and a vertical axis providing a number of photons received during each time bin. The histogram bins may be defined in width by the resolution of the synchronizing unit, which can be selected by the user and the tuning range depends on the specific unit employed.

Referring again also to FIG. 3, per process block 66, the computer 53 monitors the histogram data 70 to identify a first time bin 72 holding a photon count representing photons from the laser 30 received by the SPADs 38 after a single reflection off of the relay wall 14. This time bin 72 will generally have a photon value much higher than the photon values of later bins representing photons returned from the objects 20 or 26 (shown in FIG. 1). The height of the photon value of time bin 72 is intentionally moderated by the non-confocal operation of the SPADs 38 which reduces the light of direct reflection to the SPADs 38 from the illumination points 34.

The SPADs 38 have a "hold off" time 71 after the arrival of the first detected photon when they are blind to subsequent photons. The hold off time 71 is generally much larger than the length of the bins of the histogram 70. For example, bins of the histogram 70 may be on the order of 4 ps whereas the hold off time may be 50 ns or more. The result is a "pileup effect" which leads to an overrepresentation of early photons in the histogram 70. For this reason, the present invention may gate the SPADs 38, for example, starting at the beginning of a gating interval 74 causing the SPAD's 38 to ignore photons before the gating time 74.

Under software control, the start and end times gating interval 74 may be varied with respect to the timing of the laser pulse to provide improved measurement of photons arriving in the later bins of the histogram 70. In particular, the gating 74 allows the suppression of extremely strong light signals immediately preceding the light signals from the hidden scene that would otherwise obscure those later light signals.

In this regard, as noted by process block 66, the computer 53 can dynamically identify a first histogram bin at time 72 representing a strong light signal, for example, direct reflection photons that precede the indirect reflection photons of the hidden scene. This time 72 may be used as a starting point for sweeping the gating signal 74.

In addition, the gating interval 74 may be adjusted not only to eliminate the "first bounce" light from the laser 30 off of the wall 16 but also to separate signals from later time bins that receive many more photons than others. These later bins will also cause pileup and after pulsing that can be removed by blocking them with a gate.

Further, the gating interval 74 may be adjusted to block interference from ambient light and as detector noise (dark counts). These photons also cause pile-up and after pulsing and they also can be blocked with a gate.

The computer may also identify a decay time 76 that represents the arrival of the last photons from the current laser excitation. The decay time 76 is determined by the scene geometry but may be measured by starting with a relatively slow laser pulse repetition rate and tracking the last measurable bin of the histogram 70. The decay time 76 represents an end point of any necessary sweeping of the gating signal 74 and can help define the maximum laser pulse repetition rate. Normally, the decay time 76 is an amount of time sufficient to receive photons over the entire size of the hidden scene and for that reason defines a maximum laser pulse repetition rate which can be dynamically adjusted according to measurements of the decay time 76. Laser pulse repetition rates that repeat before the decay time 76 will cause ambiguity in the scene reconstruction.

In some embodiments, gating interval 74 (including start time and/or end time) and laser pulse repetition rate may be stored in a table associated with each illumination point 34 to allow predictive adjustment of the gating window position during the scanning process based on the previous history (which may be extrapolated or averaged). This allows the gating window time position 74 and laser pulse repetition rate to be more accurately assessed (indexed according to particular illumination points 34) while allowing evolution of these values, for example, when there is relative motion between the NLOS camera system 10 and the imaged objects 20 and 26.

At succeeding process block 78, the outputs from the synchronizing unit 40 providing histogram data 70 are used to reconstruct an image, for example, using a variety of reconstruction techniques such as filtered back projection which will be discussed in more detail below.

At the conclusion of these steps 62, 64, 66, and 68, the program 57 loops back to process block 62 activating a different color of the laser 30 and repeating these steps.

The processes of process block 62, 64, 66, and 78 may be concurrent meaning that they execute in parallel and repeat for each illumination point 34.

When sufficient data has been acquired (typically at least one full set of illumination points 34 for each color), the data may be processed as indicated by process block 80 to display a first image of objects 20. This image will have a perspective taken from the vantage point of a camera located at the light relay area 16. Accordingly the light relay area 16 may be considered a virtual camera.

Figure 4:
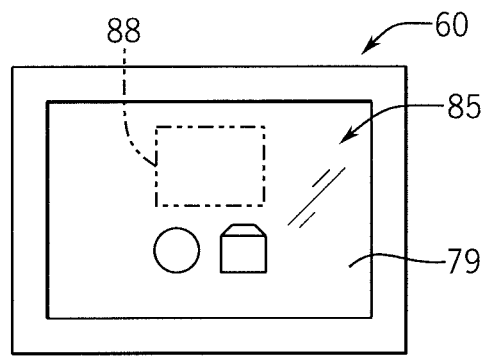
FIG. 4 is a simplified representation of a screen display of the present invention showing the designation of a virtual camera on a second relay wall.

Referring momentarily to FIG. 8, the process of reconstructing an image per process block 80 above, may use the precise 3D locations both of each given illumination point 34 and the focal centers 49 of a receiving SPAD 38 determined using the stereo cameras 46. Each given time-of-flight measurement, being a round-trip time of a photon from the laser 30 to a SPAD 38, provides data of a reflection somewhere along an ellipsoidal surfaces 82 (approximately defined by the locus of points equidistant from illumination point 34 and focal centers 49 of illumination points 34 and 39). This collected data thus evaluates a "projection" equal to the line integral of all light reflected along the ellipsoidal surface 82. This projection of this data to a plane data can be treated in the same manner as projection data of computed tomography and reconstructed using similar algorithms to reconstruct a cube of data 84 providing reflection values over a Cartesian grid mapping the physical space. Projections of this grid to a two-dimensional plane can provide a two-dimensional image 79 (for example, shown in FIG. 4). This two-dimensional image 79 need not be from the vantage point of the virtual camera of the first light relay area 16 but is limited to points that would be illuminated by this first light relay area 16. This image 79 may be displayed at process block 80 and as shown in FIG. 4 as display 85 on terminal 60. Generally this image 79 will show only objects 20 of FIG. 1 and not object 26. The image 79 will be a "color image" providing two colors related to the frequencies of the laser 30. Because the frequencies of the laser 30 do not match the normal color space of the human eye, this color image will be a "false" color image but may still yield important information. The invention contemplates that additional laser frequencies may be used to provide for multi spectral or hyperspectral images.

The present invention, by providing substantially greater precision in mapping of the illumination points 34 and focal centers 49 and greater range through the use of gated SPADs 38, permits the generation of a second virtual camera, for example, based on a second light relay area 24 shown in FIG. 1. Referring to FIGS. 4 and 8, in this regard, the present invention allows definition of a second virtual camera surface 88 within the image 79 related to particular data points 90 in the cube of data 84. This selection process is indicated by process block 92.

This second virtual camera surface 88 may be used for same calculation shown in FIG. 8 with respect to illumination points 34 and 39 but for points 90. At these greater distances from the laser 30 and the SPADS 38, the difference between illumination points 34 and 39 may begin to diminish in importance making the ellipsoidal surfaces 82 those of a spherical surface. In this case the stereo camera 46 is no longer used except to the extent that it allows higher precision in the measurement of the light relay area 16 enabling this later reflection to be resolved. Using this new virtual camera location, an image of objects 26 may be generated as indicated by process block 94. Note that the virtual camera surface 88 may be defined to be much larger than the light relay area 16 to provide improved light gathering capacity.

Referring now to FIG. 6, the acquisition speed of the NLOS camera system 10 can be increased through the use of two lasers 30a and 30 having different colors (for example, the colors described with respect to laser 30 above). These two different colors may be independently distinguished by the SPADs 38a and 38b as before but the lasers 30a and 30b may be separately steered by different galvanometers 31a and 31b to simultaneously illuminate different illumination points 34 effectively doubling the speed of data acquisition. As shown in FIG. 7 the first laser 30 may pulse at a repetition rate shown by pulses 100 with a sample gating time 101 occurring after the hold-off time 74, and the second laser 30b may pulse at interleaved times indicated by pulses 102 with gating time 101b. By being able to isolate these colors in the returning light signals using separate SPADs 38a and 38b, the necessary hold-off time 74 for laser 30a need not delay the firing of laser 30b and vice a versa. The same principle applies with respect to decay time 76. This acceleration of sampling can be increased by using an additional number of lasers provided that sufficient frequency discrimination can be obtained.

Referring now to FIG. 9, an individual SPAD 38 may be constructed to provide for a sensor array 118 of independent sensing elements 120, for example, arranged in rows and columns so as to provide for multiple focal points 35 shown in FIG. 2. This may help reducing the entire acquisition time, as per each illumination points 34, the SPAD sensor array 118 is capable of acquiring data arriving at different relay wall points. Because of this, video frame rate images are achievable.

Referring now to FIG. 10, this ability to designate portions of a wall as a virtual camera can be used, for example, to image the backside of an object 20 when the object 20 is after an occluder 18 or directly in the field of view of the NLOS camera system 10. For this imaging, the NLOS camera system 10 may create an image of the relay wall 14 or secondary relay wall 22 particularly selecting only area 100 (which need not be contiguous) not occluded by the object 20. This may be done by the user or automatically by identification of the object 20 and masking the object out of the employed image. In the direct imaging example, the stereo cameras 46 may be used to identify this image of the relay wall 14.

After this region is identified, the area 100 may be used as a virtual camera to create an image of the backside of objects 20. Such reverse side imaging may be useful, for example, in machine inspection or the like allowing an object to be imaged over 360° from a single side.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference, which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A non-line-of-sight imaging system comprising:
a light source emitting light pulses along a propagation direction receivable by a relay wall at a variety of illumination points;
a time-of-flight detector communicating with the light source to receive light back against the propagation direction to make time-of-flight measurements of photons returning from the relay wall after reflection off of an object not within a line-of-sight of the time-of-flight detector;
an optical position finder having an electronic light sensor providing a position measurement of the illumination points on the relay wall from received light from the relay wall; and
an electronic computer receiving the time-of-flight measurements and position measurements of each of the illumination points to produce an image of the object receiving light from the relay wall as a function the time-of-flight measurements and position measurements.

2. The non-line-of-sight imaging system of claim 1 wherein the optical position finder employs reflected light from the light source.

3. The non-line-of-sight imaging system of claim 2 wherein the optical position finder measures a location of the illumination points concurrent with their illumination.

4. The non-line-of-sight imaging system of claim 2 wherein the optical position finder measures the focal center of the time-of-flight camera system on the relay wall.

5. The non-line-of-sight imaging system of claim 4 further including a targeting laser transmitting a beam to strike the relay wall at the focal center of the time-of-flight detector visible by the optical position finder.

6. The non-line-of-sight imaging system of claim 1 wherein the optical position finder provides position measurements in three dimensions.

7. The non-line-of-sight imaging system of claim 6 wherein the optical position finder provides a first and second camera displaced from each other and each providing angular measurements of each illumination point to provide for triangulation of the illumination point.

8. The non-line-of-sight imaging system of claim 1 wherein the electronic computer determines a region of the relay wall free from occlusion by the object and reconstructs an image from a point of view of the relay wall to produce an image of a rear side of the object.

9. The non-line-of-sight imaging system of claim 1 wherein the time-of-flight detector is oriented to provide a focal point of the time-of-flight detector on the relay wall displaced from illuminated illumination points.

10. The non-line-of-sight imaging system of claim 1 wherein the time-of-flight detector provides multiple independent photon detectors having different focal axes displaced from an axis of propagation of the light source.

11. The non-line-of-sight imaging system of claim 1 wherein the light source produces two distinguishable frequencies of light and wherein the time-of-flight detectors collect separate measurements for each frequency of light.

12. The non-line-of-sight imaging system of claim 11 wherein the two distinguishable frequencies of light are transmitted along a same propagation axis and wherein the electronic computer provides a color dimension to the image of the object receiving the light based on separate measurements of each frequency of light.

13. The non-line-of-sight imaging system of claim 11 wherein the two distinguishable frequencies of light are transmitted along displaced propagation axes to different illumination points to provide increased scanning speed through the illumination points.

14. The non-line-of-sight imaging system of claim 1 wherein the time-of-flight detector provides simultaneous independent measurements of different illumination points to provide increased scanning speed through the illumination points.

15. A non-line-of-sight imaging system comprising:
a light source emitting light pulses along a propagation direction receivable by a relay wall at a variety of illumination points;
a time-of-flight detector communicating with the light source to receive light back against the propagation direction to make time-of-flight measurements of photons returning from the relay wall after reflection off of an object not within a line-of-sight of the time-of-flight detector;
an optical position finder having an electronic light sensor providing a position measurement of the illumination points on the relay wall from received light from the relay wall; and
an electronic computer receiving the time-of-flight measurements and position measurements of each of the illumination points to produce an image of the object receiving light from the relay wall;
wherein the time-of-flight detector uses a gating signal from the electronic computer controlling time-of-flight measurements by the time-of-flight detector to occur exclusively in a specified gating time and wherein the electronic computer adjusts the gating time to occur after receipt of light from the light source after initial reflection from the relay wall from each given illumination point.

16. The non-line-of-sight imaging system of claim 15 wherein the electronic computer monitors the time-of-flight detector to detect receipt of light from the light source after initial reflection from the relay wall to adjust the gating signal to occur after receipt of light from the light source after the initial reflection from the relay wall from each given illumination point.

17. The non-line-of-sight imaging system of claim 15 wherein the gating signal is adjusted by the electronic computer according to stored different values for different illumination points.

18. The non-line-of-sight imaging system of claim 15 wherein the gating signal is adjustably delayed after the receipt of light from the light source after the initial reflection from the relay wall from each given illumination point to resolve photon time-of-flight within a hold-off time of the time-of-flight detector.

19. A non-line-of-sight imaging system comprising:
a light source emitting light pulses along a propagation direction receivable by a relay wall at a variety of illumination points;
a time-of-flight detector communicating with the light source to receive light back against the propagation direction to make time-of-flight measurements of photons returning from the relay wall after reflection off of an object not within a line-of-sight of the time-of-flight detector;

an optical position finder having an electronic light sensor providing a position measurement of the illumination points on the relay wall from received light from the relay wall; and an electronic computer receiving the time-of-flight measurements and position measurements of each of the illumination points to produce an image of the object receiving light from the relay wall;

wherein the light source provides a pulse control input controlling the pulse repetition rate of the light source and wherein the electronic computer adjusts the pulse repetition rate according to the received time-of-flight measurements to control the size of the scene.

20. A non-line-of-sight imaging system comprising:

a light source emitting light pulses along a propagation direction receivable by a relay wall at a variety of illumination points;

a time-of-flight detector communicating with the light source to receive light back against the propagation direction to make time-of-flight measurements of photons returning from the relay wall after reflection off of an object not within a line-of-sight of the time-of-flight detector;

an optical position finder having an electronic light sensor providing a position measurement of the illumination points on the relay wall from received light from the relay wall; and an electronic computer receiving the time-of-flight measurements and position measurements of each of the illumination points to produce an image of the object receiving light from the relay wall;

wherein electronic computer receives inputs identifying a region of a second relay wall and reconstructs an image from a point of view of a second relay wall receiving light from the relay wall.

21. The non-line-of-sight imaging system of claim 20 further including a display communicating with the electronic computer to display a reconstructed image from a point of view of the relay wall and identifying in the reconstructed image a second relay wall receiving light from the first relay wall to reconstruct an image from a point of view of the second relay wall.

* * * * *